No. 643,115. Patented Feb. 13, 1900.
E. C. FREAD.
ROAD GRADING MACHINE.
(Application filed Oct. 13, 1899.)
(No Model.) 2 Sheets—Sheet 1.
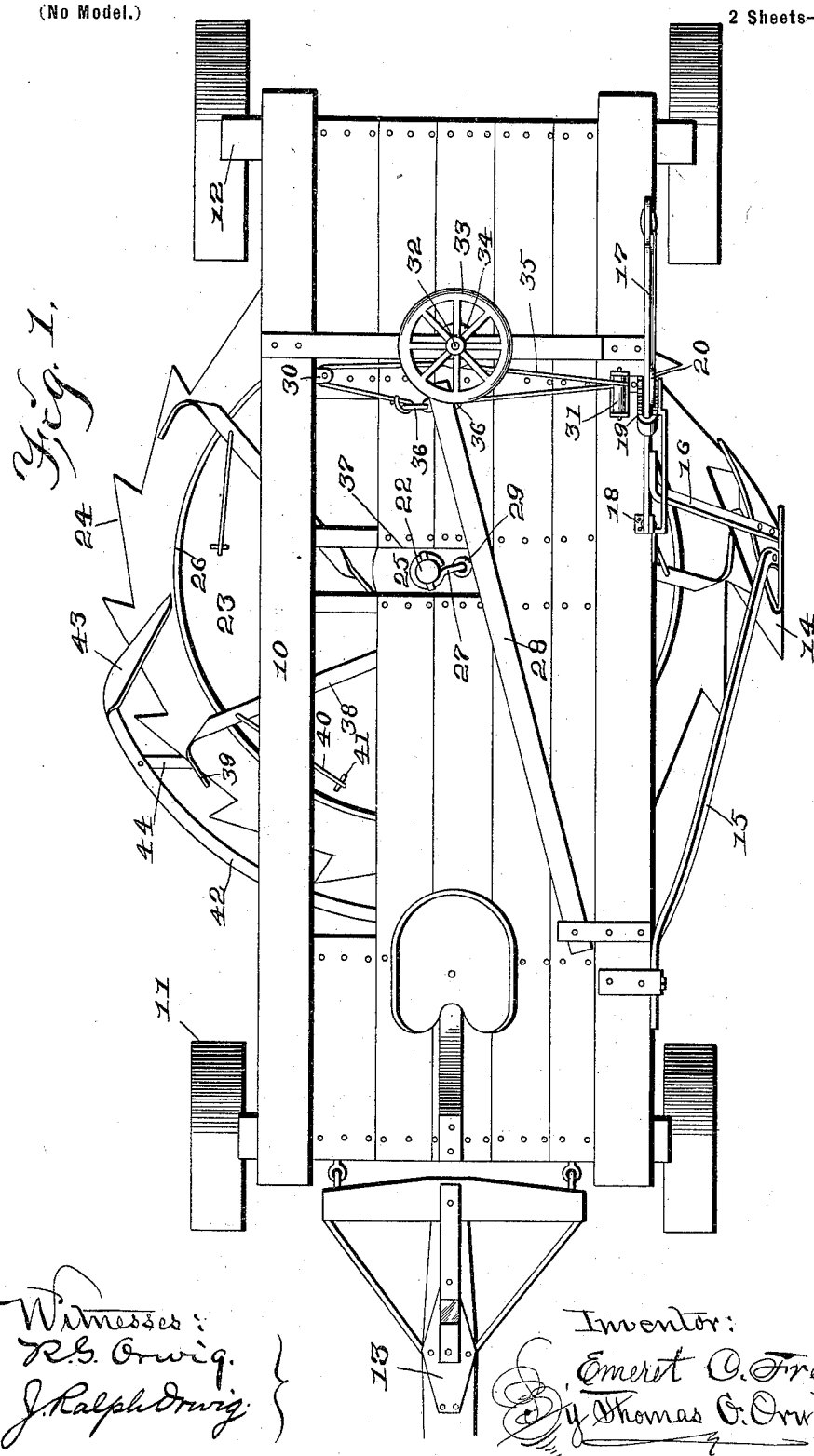

No. 643,115. Patented Feb. 13, 1900.
E. C. FREAD.
ROAD GRADING MACHINE.
(Application filed Oct. 13, 1899.)
(No Model.) 2 Sheets—Sheet 2.
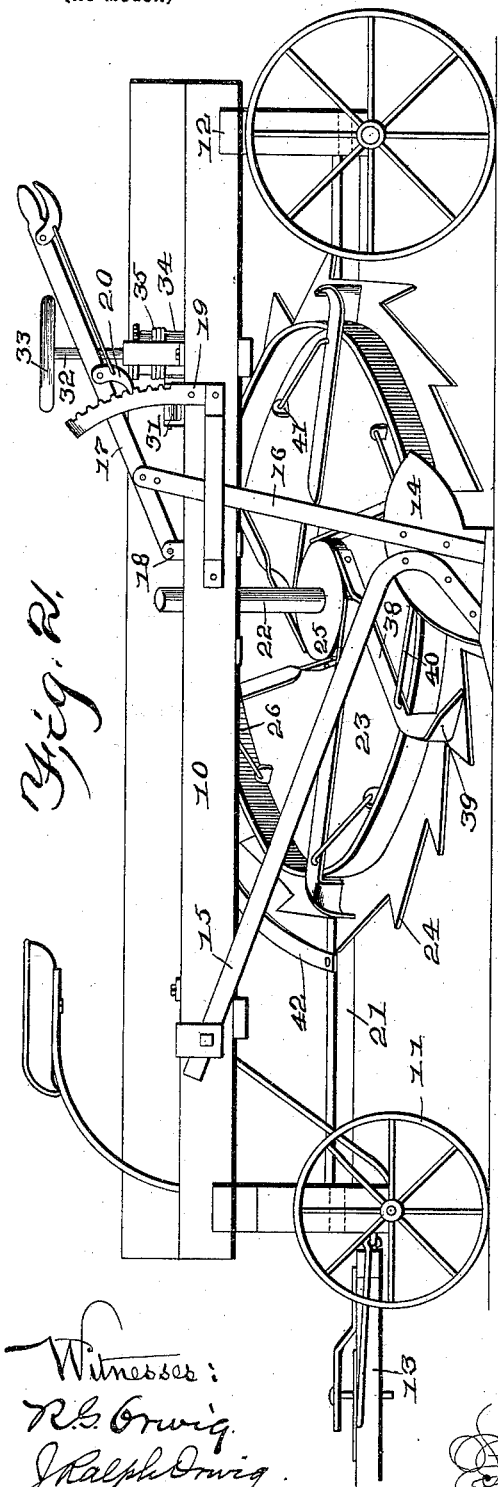
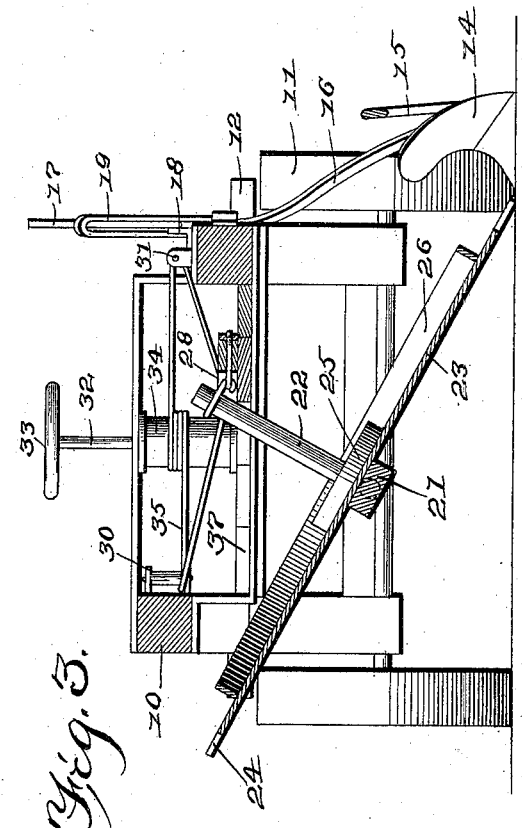
Witnesses:
R. G. Orwig.
J. Ralph Orwig.
Inventor:
Emeret C. Fread,
Thomas G. Orwig, Attorney.

UNITED STATES PATENT OFFICE.

EMERET C. FREAD, OF DES MOINES, IOWA.

ROAD-GRADING MACHINE.

SPECIFICATION forming part of Letters Patent No. 643,115, dated February 13, 1900.

Application filed October 13, 1899. Serial No. 733,543. (No model.)

*To all whom it may concern:*

Be it known that I, EMERET C. FREAD, a citizen of the United States, residing at Des Moines, in the county of Polk and State of Iowa, have invented a new and useful Road-Grading Machine, of which the following is a specification.

One object of my invention is to provide a road-grader of simple, strong, durable, and inexpensive construction that may be operated to cut into the ground-surface and convey the ground thus loosened to a considerable distance laterally with a minimum of applied draft-power.

A further object is to provide a road-grader of the class in which a plow is used to cut into the ground-surface, that may be operated on almost any kind of ground, to convey the earth to a point of discharge a considerable distance laterally from the plow without the use of gearing of any kind and without danger of becoming clogged or inoperative on account of different conditions in the ground.

My invention consists, essentially, in the construction, arrangement, and combination, with a platform mounted on wheels and carrying a plow, of a device for receiving the ground from the moldboard of the plow and for conveying it laterally to the opposite side of the machine and there discharging it, and in certain other details of construction, arrangement, and combination of parts, as hereinafter set forth, and pointed out in my claims and illustrated in the accompanying drawings, in which—

Figure 1 shows a top or plan view of the complete apparatus. Fig. 2 shows a side elevation of the same. Fig. 3 shows a central transverse vertical section view of the same looking rearwardly.

Referring to the accompanying drawings, I have used the reference-numeral 10 to indicate the machine-platform, which is mounted upon the forward trucks 11 and the rear trucks 12. A tongue 13 is attached to the forward end of the machine, to which the draft-animals are attached.

This invention relates to that class of road-graders in which a plow is employed to cut into the ground-surface and a disk is mounted adjacent to the plow in a position inclining from the horizontal toward the plow, upon which the earth from the moldboard of the plow is deposited and which is carried by the disk in its rotation to a point distant from the plow and there discharged.

My object is to provide a disk of this class of improved construction and to provide improved means for supporting and adjusting it and also to provide improved means for removing the earth from the disk.

A straight wooden bar 21 is extended longitudinally beneath the platform and pivotally mounted in the forward and rear trucks, and a round shaft 22 is fixed to the bar to project upwardly and laterally toward the left side of the platform. Mounted on top of the said bar 21 is a flat metal disk 23, having a toothed periphery 24. A hub 25 is located on the top central portion of the disk, which is rotatably mounted on the shaft 22. On the top surface of the disk 23 and at some distance from the periphery thereof is an upwardly-projecting rim 26. At the upper end of the shaft 22 is a link 27, and on top of the platform 10 a lever 28 is pivoted near the forward end of the machine and extended rearwardly and transversely of the machine to a point near the rear end of the machine, and an eye 29 is fixed to the lever to receive the link 27. I have provided means for moving this lever 28 laterally, as follows: A pulley 30 is fixed to one side of the platform 10 and a pulley 31 to the opposite side. A shaft 32, having a hand-wheel 33 at its top and a drum 34 at its lower end, is rotatably mounted on top of the platform, between the said pulleys, and a rope or cable 35 has its end portions attached to lugs 36 on opposite sides of the rear end of the lever 28, and then one end is passed around the pulley 30 and the other around the pulley 31, the central portion of the rope or cable 35 being wound upon the drum 34. The platform 10 is slotted at 37 to admit the shaft 32, and obviously upon the rotation of the hand-wheel 33 the said shaft 22 will be tilted and the disk 23 raised or lowered with relation to the plow. The parts above described are so shaped and proportioned that the serrated edge of the disk 23 will lie under the moldboard of the plow.

On the hub 25 a series of arms 38 are pivoted to move vertically and are extended tangentially therefrom to project over the rim 26, and on the centers of said arms the shovels 39 are formed, which shovels project downwardly to rest upon the top surface of the disk 23 and which project forwardly in the direction of the line of rotation of said disk. Near the outer end of each of said arms 38 a rod 40 is fixed, which rod projects therefrom in a direction substantially circumferentially of the disk to a lug 41 on the top of the disk, where it is pivotally mounted. This rod will obviously not hinder a vertical movement of the arm 38, and at the same time limits its movement in a circumferential direction. On the bar 21 in front of the disk is an arm 42, which arm is curved in a direction concentric with the disk, and on its end, which is on the opposite side of the disk from the plow, is a guide or scraper 43, which rests upon the top surface of the disk. This rod is braced by means of a second rod 44, which is also secured to the bar 21, and the guide and scraper serves the double function of removing the ground from the disk and of elevating the shovels 39, so that the ground in the shovels may be released and discharged with the ground on top of the disk.

In practical use it is obvious that the plow may be readily raised or lowered by an operator standing upon the platform so as to cut to the desired depth, which of course varies under different conditions of the ground-surface. When the plow is thus raised or lowered, the disk is tilted by a manipulation of the hand-wheel 33 to a position where the ground from the moldboard of the plow will fall upon it and to a position where the lower edge of the disk will rest upon the ground-surface. Then as the machine is advanced the disk will be rotated by reason of its contact with the ground-surface. The ground which falls upon the disk will be carried by means of the shovels 39 around with the disk until the guide and scraper 43 is reached. This guide will then elevate the shovels and the earth will be scraped from the disk to be deposited upon the ground-surface. Obviously this means of conveying ground laterally will operate almost automatically, inasmuch as no gearing is required, and the disk is rotated solely by reason of its contact with the ground-surface and also by reason of the impact of the ground from the moldboard upon the disk. Hence an almost inappreciable amount of power is required for conveying the earth, and the machine may be operated by an amount of power only slightly in excess of the amount required for operating a plow.

Having thus described my invention, what I claim, and desire to secure by Letters Patent of the United States therefor, is—

1. In a road-grader, the combination with a plow and means for carrying it, of a rotatable disk adjacent to the moldboard of the plow and inclined from the horizontal toward the plow and having the teeth 24 formed on its periphery for the purposes stated.

2. In a road-grader, the combination with a plow and a frame for carrying it, of a beam extending longitudinally of the said frame and pivoted thereto at the ends to swing in a vertical plane, of a shaft in said beam rotatably mounted, a disk on the lower end of said shaft and means for tilting said beam, substantially as and for the purposes stated.

3. In a road-grader, the combination with a plow, and means for carrying it, of a bar to extend parallel with the line of advance of the plow and pivotally mounted to move in a plane at right angles to the line of advance, a disk rotatably mounted upon the bar, means for tilting the disk so that its edge adjacent to the plow may be raised or lowered with the plow, a flange on the top surface of the disk, a series of rods pivoted to the hub of the disk and extended tangentially outwardly therefrom, shovels on the ends of these rods to engage the top surface of the disk, a rod fixed to the said bar, and a scraper and guide on its end to rest upon the top surface of the disk at the side opposite from the plow, substantially as and for the purposes stated.

4. In a road-grader, the combination with a platform mounted on wheels, and a vertically-adjustable plow thereon, of a disk rotatably mounted beneath the platform and tilted downwardly toward the plow, means for scraping the ground from the disk, a shaft passed through the disk and capable of tilting in a plane at right angles to the line of advance, a shaft on top of the platform, a hand-wheel and a drum on said shaft, a lever pivoted to the machine-frame and connected with the said shaft which supports the disk, and a rope or cable having its ends fixed to the opposite sides of the said lever, its central portion wound upon said drum, and pulleys at the opposite sides of the platform over which the said rope or cable is passed, substantially as set forth.

EMERET C. FREAD.

Witnesses:
C. F. WILCOX,
THOMAS G. ORWIG.